United States Patent [19]

Bakke et al.

[11] 4,005,755
[45] Feb. 1, 1977

[54] MACHINE FOR ROCK REMOVAL AND SOIL CULTIVATION

[76] Inventors: Even A. Bakke, Skrenten 5, Gjovik, Norway, 2800; Kaare W. N. Berg, c/o Jostein Berge, Ottestad, Norway, 2312

[22] Filed: Dec. 9, 1974

[21] Appl. No.: 530,950

[30] Foreign Application Priority Data

Dec. 14, 1973  Norway ............................. 734786

[52] U.S. Cl. ..................... 172/32; 299/7; 241/200; 172/123; 172/112; 171/64; 171/13; 171/15; 209/84; 37/142 R
[51] Int. Cl.² ................. A01B 17/00; A01B 43/00
[58] Field of Search ............ 171/14, 63, 64, 15; 172/32, 123, 112, 163; 299/7, 8, 9, 37; 209/86, 92, 95, 84, 102; 241/284, 200

[56] References Cited

UNITED STATES PATENTS

| | | | |
|---|---|---|---|
| 222,603 | 12/1879 | Sackett | 172/163 |
| 871,176 | 11/1907 | McCargar | 241/200 |
| 1,092,780 | 4/1914 | Lyle | 241/200 X |
| 1,368,113 | 2/1921 | Carlson | 172/32 |
| 1,454,668 | 5/1923 | Bugla | 171/63 |

Primary Examiner—George J. Marlo
Attorney, Agent, or Firm—Robert E. Isner

[57] ABSTRACT

This invention is concerning a machine for rock removal and soil cultivation of newly broken or established farming areas. The machine picks up soil and rocks to a significant depth, and by a mixing and grinding process, breaks up sod, roots, and lumps of soil and by a classification process returns the size reduced material and small rocks to the ground, and retains the larger rocks.

12 Claims, 13 Drawing Figures

MACHINE FOR ROCK REMOVAL AND SOIL CULTIVATION

This invention is concerning a machine for cultivating the soil for the purpose of farming, and especially for removal of rocks from soil, whether already cultivated or soil in the process of cultivation for farming.

Agriculture today is faced with serious difficulties regarding cultivation and improvement of the soil with efficient and inexpensive methods. There is a demand for larger farming areas, improved methods for cultivating the soil, and especially much more efficient means for removal of rocks and roots than those available today.

The removal of small rocks, both from new ground and from cultivated soil, has mostly been a manual task, limited to the surface. Today, machines for collecting and loading stones and smaller rocks are available, but they work only on the surface, or to very shallow depths (4 inches). These machines are usually equipped with a multitude of collecting forks, rakes and conveyors of different types.

Some machines are capable of working to somewhat larger depths. These may roughly be classified as devices with grids, vertical collecting wheels, conveyor belts, sometimes combined with revolving screens (Rotating classifying drums).

In the first mentioned group, machines are available both with a belt conveyor, that travels around the classifying grid, and is carried by this, and machines with overhead belts.

The common feature of these machines is, that they all utilize a cutting edge which penetrates the soil, turns it over onto some type of conveyor, that transfers the soil with rocks and lumps to the classifying drum, usually arranged in a horizontal (or slightly inclined) position.

The common characteristics of the machines, available today are:

1. They are very sensitive to the moisture content of the soil. Moist soil tends to form into lumps, that roll through the drum and are wasted. This difficulty is greatly increased if the soil contains clay.

2. In order to obtain a reasonably effective separation, it is therefore necessary, that the ground is comparatively dry. But not only that: It will be desirable, if not necessary, that the top soil be softened up, and reduced to small lumps to a depth, somewhat larger than the depth range of the machine to be used.

3. Rainstorms will cause serious delay, the length of which will depend on soil characteristics, the concentration of rocks, and drainage. The more rocks, the earlier removal operations can start after the rain storm. The dryer ground, the greater depth may be treated.

The depth range of the different machines is usually quite limited. Only a few types can under the most favorable working conditions, including some kind of pretreatment of the top soil layer, work down to approximately 8 inches. The most common depth penetrations are 3 inches to 6 inches. For rock removal down to normal plowing depth, it is required to treat the soil several times, harrowing between each run, and maybe also run the plough more times.

Experiments have shown, that the quality of the rock removal after three complete runs with available machines, is not satisfactory for subsequent use of automated potato harvesters. Multiple runs mean higher costs and unwanted compaction of the top soil.

For a long time, there has been a desire to develop a machine which would be nearly unsensitive to varying moisture content in the soil, would demand pretreatment of the soil only when rock sizes are above 20 inches of when heavy tree stumps have to be removed, and would be able to work effectively down to approximately 16 inches depth. Furthermore, the new machine should be able to break up soil or clay lumps, and disintegrate heavy turf, with the least possible pretreatment.

The objective of this invention is therefore to provide a soil cultivating machine, with which the top soil will be treated, so that rock removal down to the smallest desired size in one operation will be possible. A further objective is to provide a device where the problem of wedging and stoppage of the mechanisms is circumvented, the mechanisms are self cleaning, the device has the desired classifying characteristics, which is independent of the soil moisture content. A further objective is to describe a device, that can penetrate deeper into the soil than any other known method or device and foliowing grubbing, can directly treat the soil and reduce all lumps and separate soil, sod, rocks and roots. In addition, the described device can be used to aeriate and mix the top soil.

According to this invention, a device for removal of rocks and for cultivation of the soil is disclosed as described in claim 1.

The machine could be pulled behind a tractor mounted on a front loader or to be self-powered.

The soil collecting device is adjusted down to the desired soil working depth and as the machine is put into motion, soil and rocks are forced upwards and torn up by the collection device and pushed into the classifying chamber. The soil will fall down through the openings in the chain belt, while rocks, lumps of soil and sod will be contained in the chamber. The conveying mechanisms on the chain belt will cause a partical reduction of the size of the lumps. In addition, the falling rocks inside the classifying chamber will grind the lumps and the sod down to small sizes, that will pass through the opening in the chain belt. Inside the classifying chamber, the chain belt will cause an effective mixing and constant and continuous circulation of the collected material, and this will cause a very efficient separation of the soil from the rocks. The linear velocity of the chain belt can be adjusted to the velocity best suited for the type of soil to be treated. The rocks separated from the incoming mixture of soil and rocks will be stored in the classifying chamber, and when the classifying chamber is filled to the extent that the separation efficiency decreases, it can be emptied by tilting the chamber or by reversing the direction of the belt motion or a combination of both. During emptying the material into a truck, the belt can be kept in motion as usual, and thereby speed up the emptying of the chamber.

The working depth of the machine into the ground will depend among other on the working width of the machine, the condition of the terrain, and on the pull of the source of power that is being used. Other factors which will influence the working depth of the unit, are the size of the rocks and their concentration.

Experiments have shown that the described device can treat all different types of soil and separate rocks down to less than 1 inch in diameter. The utilization of the soil, i.e., the type of farming, will determine the rocks sizes that are to be removed. The classifying devices on commercially available machines have a free opening which varies from 3 inches down to ¾ of an inch. Therefore, rocks with smallest dimension less than the above mentioned opening will penetrate through the belt and be returned to the ground. If the rocks are thin and long, much longer sizes can penetrate. For growing grains and animal feed plants, it is not necessary to remove rocks that can be rolled down into the soil, e.g. rocks smaller than 2 to 3 inches. For growing vegetables and potatoes, particularly if harvestting with fully or semiautomatic equipment, it is desirable to remove rocks down to 1 inch or less.

Experience has shown that smaller rocks than this, can be left in the soil without influencing the yield to any significant extent. Other characteristics of the cultivating machine will be disclosed in the claims. The invention will be described with more details by the utilization of the attached schematics. The schematics also show some examples of how the device could be constructed according to this invention. The advantages that this invention offers, will be illustrated by some specific examples of design.

The schematics show:

FIG. 1, an isometric illustration of the cultivating machine.

Figure 1:
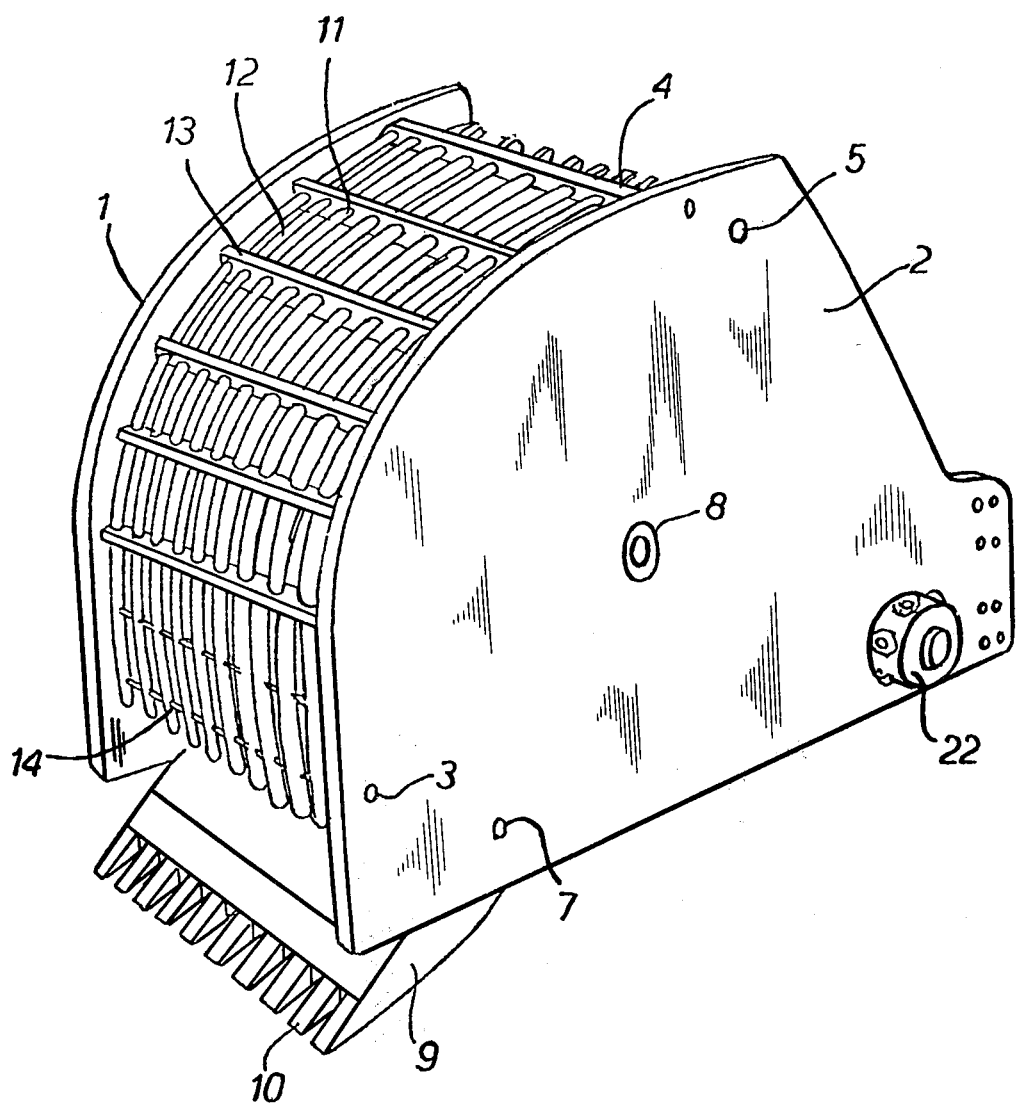

FIG. 6, a through c show the machine as illustrated in FIG. 1 in combination with a front loading machine. The lifting and tilting mechanisms are not shown in order to simplify the illustration.

Figure 7:
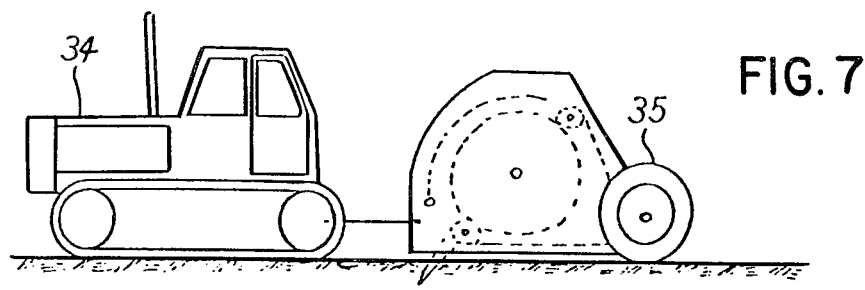

FIG. 7, shows the cultivating machine connected to a tractor for power.

Figure 8:
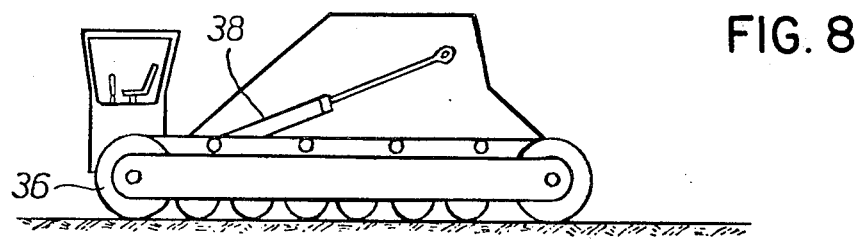

FIG. 8, shows a side view of a self-powered machine.

Figure 9:
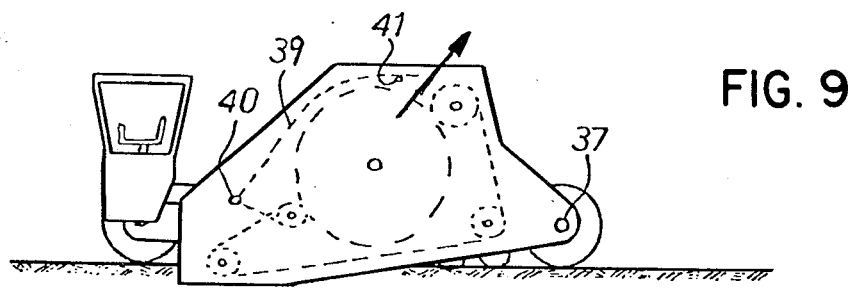

FIG. 9, shows a section view of the machine illustrated in FIG. 8, and

Figure 10A:
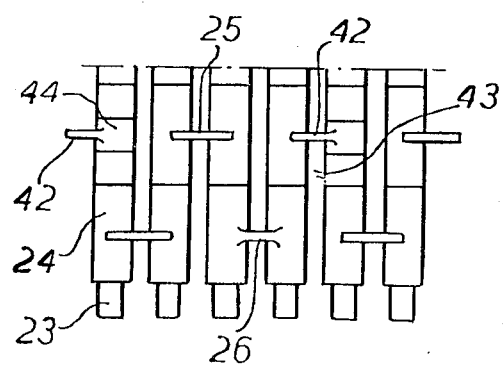
Figure 10B:
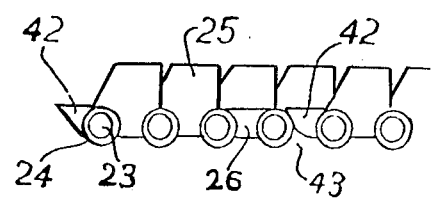

FIG. 10, a and b show a plan view and a section view of a modified chain belt.

Figure 6A:
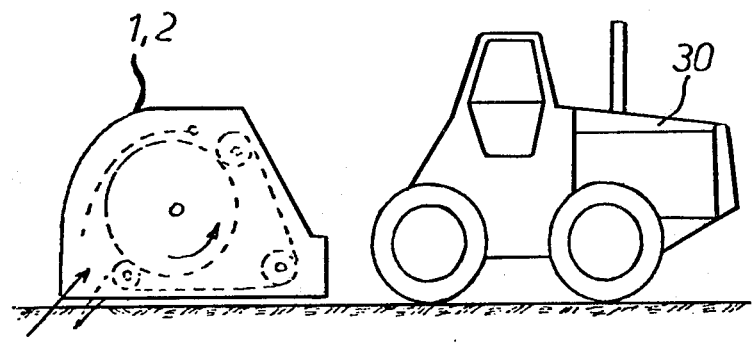

The type of machine illustrated in FIG. 1 is intended for being mounted on a front loader for example as shown in FIG. 6a. The cultivating machine consists in essence of two heavy side walls 1 and 2. These two side walls are held together by a spacer shaft 3, a grid shaft 4, a roller shaft 5, a drive shaft 6 (see also FIG. 2), a roller shaft 7 and a sprocket shaft 8. In addition to these spacer shafts it is also possible to mount other types of braces of reinforcing members, however, for simplicity, these members are not shown in the illustration but would be a matter of common design practice.

A cutting edge with replaceable teeth 10 pivots about roller shaft 7 and can be adjusted by the use of suitable means e.g. by hydraulic cylinders, screws etc. However, these details are not shown. By tilting the cutting edge 9 about the roller shaft 7 it is possible to adjust the working depth of the machine.

Figure 2:
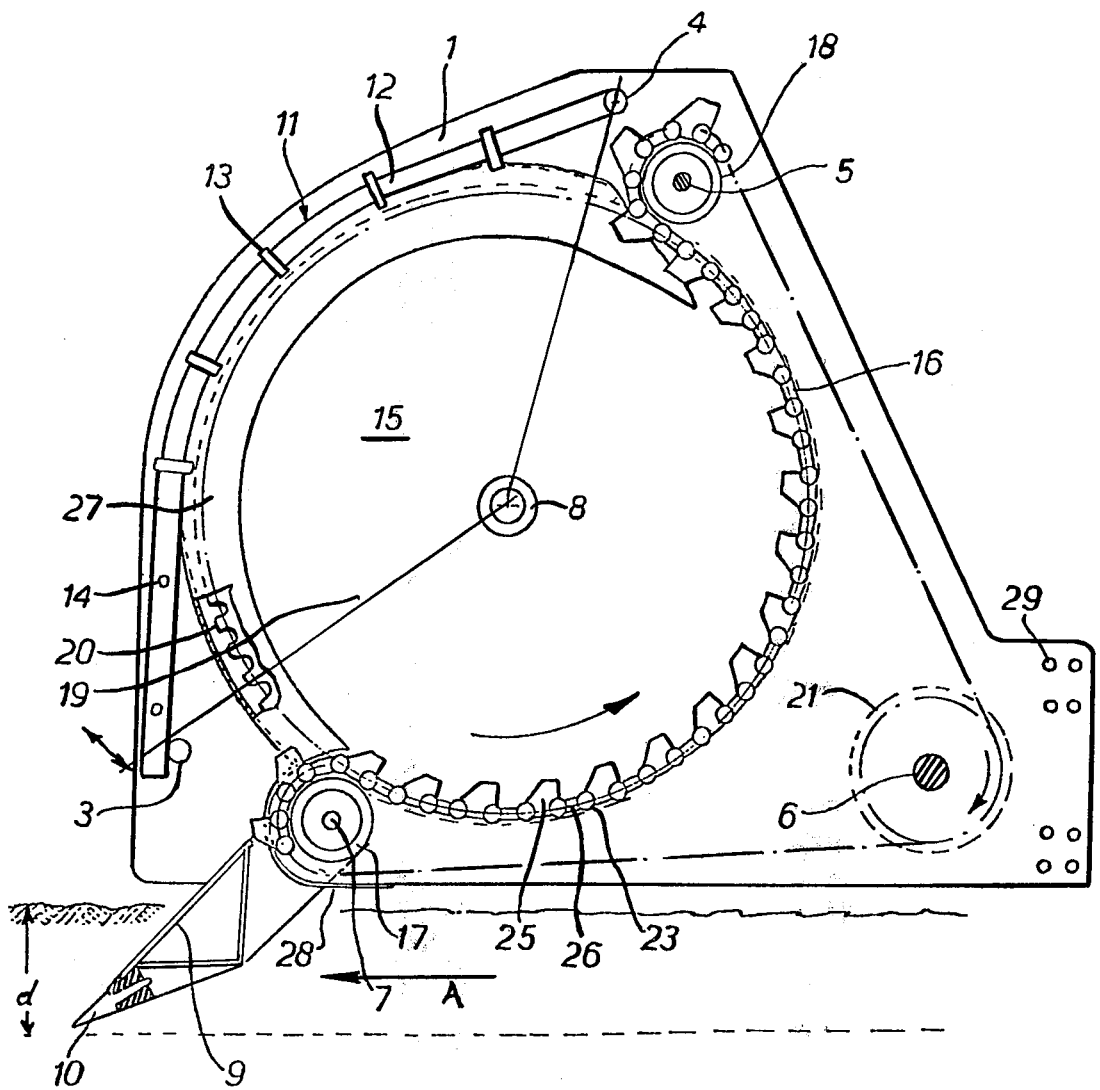
FIG. 2, shows a schematic section view of the machine shown in FIG. 1.

A grid 11, pivots about shaft 4 which is mounted between the side walls 1 and 2 and its lower end rests against the positioning rod 3. The grid is made from rods 12 which connect shaft 4 and the positioning rod 3. The rods are individually spaced axially by use of spacer bars 13. The lower end of the grid is spaced and held together by the use of rods 14. The grid 11 is curved as shown in FIG. 1, and 2 and forms the forward and the upper wall of the classifying chamber 15, which in addition is confined by the side walls 1 and 2, and the chain belt 16 which is also mounted between the side walls 1 and 2. A roller 17 is mounted by the upper end of the cutting edge 9 between the side walls 1 and 2, and said roller turns around shaft 7 and diametrically opposite of roller 17, another roller 18 is mounted between the side walls 1 and 2, and said roller turns around shaft 5 adjacent to, and inside of the side walls 1 and 2. A chain belt 16 is mounted as shown in FIG. 2 and mesh with the teeth 20 on the two large sprockets 19. The chain belt as shown in FIG. 2 is fed over a roller 18 to change the direction of the belt down to mesh with the drive sprocket 21 which is mounted on shaft 6 and is spaced between the side walls 1 and 2. These drive sprockets 21 are aligned axially with the large sprocket 29 and are driven by a hydraulic motor 22. The motor 22 is mounted on the outside of the wall 2 and is connected to the shaft 6 in a conventional way.

The hydraulic circuit necessary to power the motor is not shown, since conventional principles are used. The chain belt moves practically in a horizontal path from drive sprocket 21 to the forward roller 17 where the chain belt is turned to mesh with the large sprocket 19.

Figure 3:
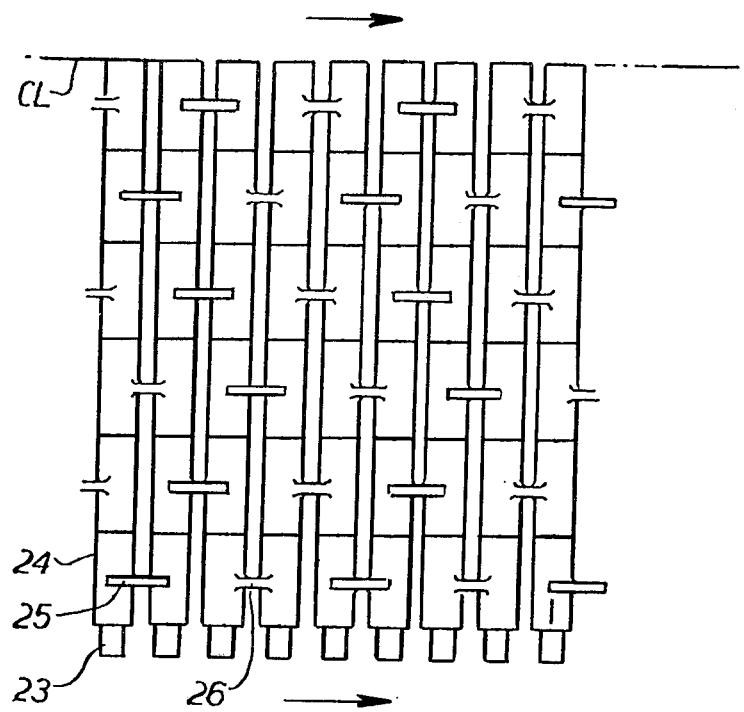
FIG. 3, shows a section of the chain belt used in the subject machine.

The chain belt construction used in this example is constructed as shown in FIG. 3, where the dotted line labeled CL indicates the center line of the belt. The chain belt consists of chain shafts 23, which on each side of the belt protrude a small distance from the chain sleeves 24. A multitude of short sleeves 24 are mounted on each chain shaft 23. In the direction of motion, pairs of sleeves are held together by a cam 25 and a smaller linkage member 26. In the direction of motion, the linkage member and the cam alternate, and transversely to the direction of motion, the rows of sleeves with linkage members and cams are offset one member as shown in FIG. 3. In this fashion, the chain members will mutually support each other and form a very strong chain belt which can, because of the elasticity of the belt, withstand heavy shocks. The chain shaft 23 extends on each side from the outermost sleeve, and will mesh with the teeth 20 on the large sprocket 19 in the classifying chamber 15.

The shaft 6 for the drive sprocket 21 is preferably attached to the side walls 1 and 2 in such a manner that it can be adjusted and the tension on the belt can thereby be changed. For the same purpose it is also possible to have the shaft for the large sprocket mounted in an adjustable bearing. It is also possible to have the drive sprocket 21 constructed as, for example the rollers 17 and 18, and power the large sprocket 19 with preferably an hydraulic motor. Roller 17 may be constructed as a shaft with a sprocket attached to each end of the shaft.

The sprocket 19 is protected by a shield 27 between the rollers 17 and 18, and the shields extend out from the side walls and a distance radially inwards and thereby protects the teeth on this part of the circumference.

Similarly, a cover 28 covers and protects the roller 17 and the chain rods 23 in the pickup region and thereby minimizes wedging and stoppage.

On the rear part of the side walls 1 and 2, several holes 29 are utilized for mounting the machine on, for example, a front loader 30 as shown in FIG. 6a. In FIG. 6a, the soil cultivating machine is marked as 1, 2. The machine is carried by the front loading mechanisms, however, the details are not shown. When powered with, for example, a front loader, the machine will be operated in the direction indicated by the arrow A in FIG. 2, with the cutting teeth 9 adjusted to the desired working depth d. The working depth is adjusted by tilting the cutting edge 9 as described above, in addition the front loading mechanisms can also, to some extent, be used to adjust the working depth.

Figure 4:
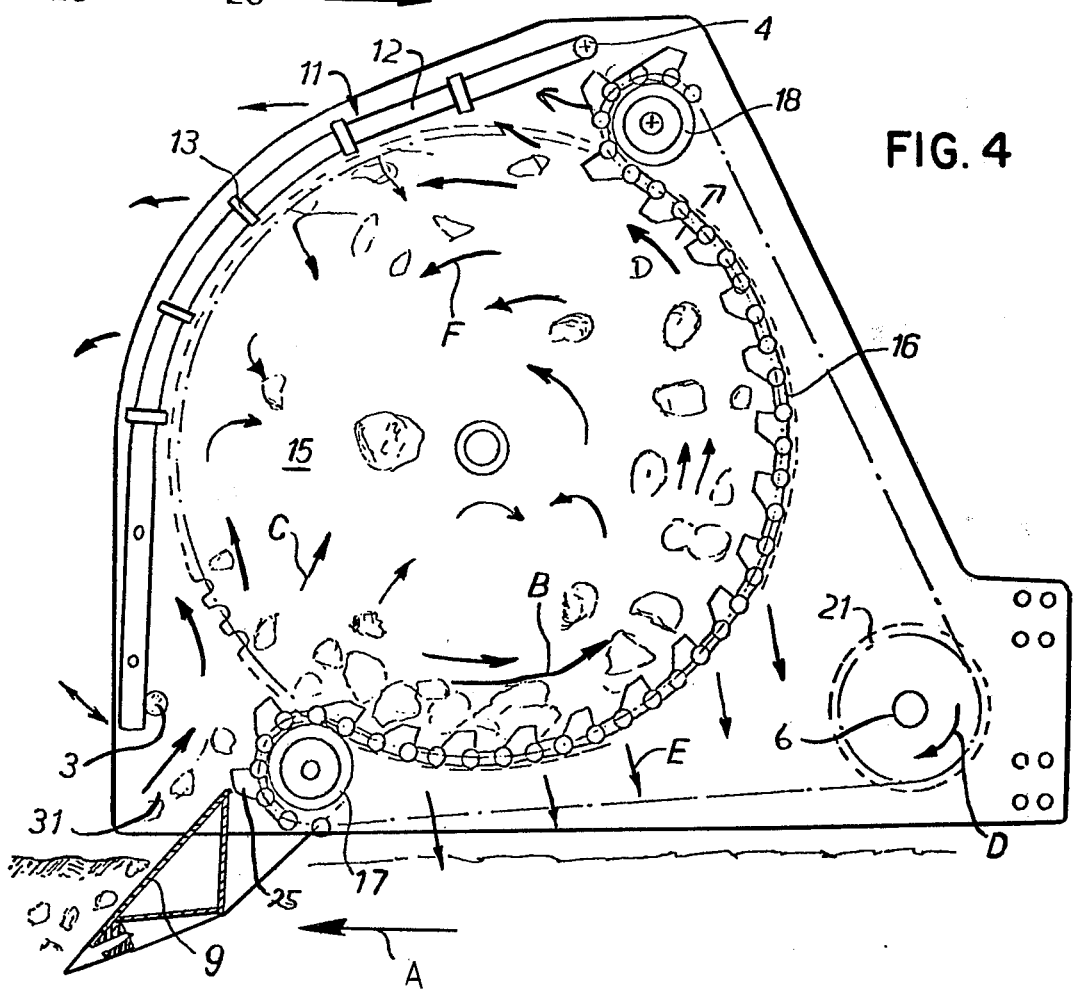
FIG. 4, shows a section view as shown in FIG. 2, however, with material being collected and classified in the chamber, and it also indicates the circulation of the collected material, inside the chamber.

The method of operation of the cultivating machine will be described in detail with the use of FIG. 4. During forward motion, the cutting teeth 10, adjusted to the correct working position, will force soil and rocks 31 up and over the cutting edge 9 and be picked up by the cams 25 on the chain belt 16 and fed into the classifying chamber 15. The chain belt moves with a relatively high linear velocity, for example it can be varied between 3 feet per second and 30 feet per second. The material picked up will therefore enter the chamber 15 with relatively high velocity when picked up by the linkage members as shown by the arrow B. Some of the material will also be thrown into the chamber 15 as indicated by the arrow C.

The direction of motion of the chain belt is indicated by the arrows D. Soil and smaller rocks will penetrate the chain belt 16 as indicated by the arrows marked E, while the larger rocks, lumps and sod is moved by the belt in an upward direction until they are forced by gravity into the open chamber as indicated by the arrows F. The rocks and lumps will hit the cross bars 13 and the rods 12 in the grid 11 and the direction of motion is thereby abruptly changed and lumps of dirt and sod will be broken down to smaller sizes. The smaller lumps and rocks will escape through the grid. The swirling motion of the collected material inside the classifying chamber will cause breaking up of lumps and sod and in addition cause a partial grinding of the rocks and an effective sorting of the material will be achieved. The belt velocity can be adjusted to suit the type of soil and the amount and size range of the rocks in the ground. Rocks and dirt, that could get wedged in between the cams and the linkage members of the chain belt will be thrown outwards when the direction of the belt is abruptly changed over the upper roll 18, where the belt cams are extended to an open position and where the centrifugal forces become substantially stronger because of the smaller diameter of the roller and because direction of the centrifugal forces is reversed.

As the classifying chamber becomes filled with rocks, they will form a mass of rocks placed at an angle approximately equal to the angle of repose, the classifying efficiency will decrease to a point when the machine will not accept any more material. However, during the whole cycle, when rocks and soil will be kept in a tumbling motion and the material closest to the chain belt is circulated around and will be replaced by material from adjacent layers and the following advantages are achieved:

a. Sod and lumps of soil are grinded between the rocks and are broken by the cams 25 and the cross members 13 and bars 12 in the grid 11.

b. The material is given no opportunity to stratify and thereby slow down the separation process of soil from rocks.

c. Adhering soil to the rocks will be torn off.

d. The separation process is very rapid and the soil that escapes is aerated and well mixed.

When the chamber is filled to capacity and can not accept any more material, it must be emptied for rocks. This can be achieved by the use of a front loader 30.

Figure 6B:
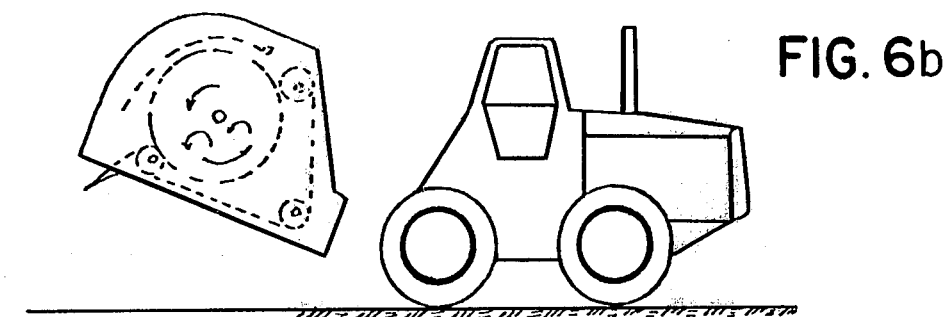
Figure 6C:
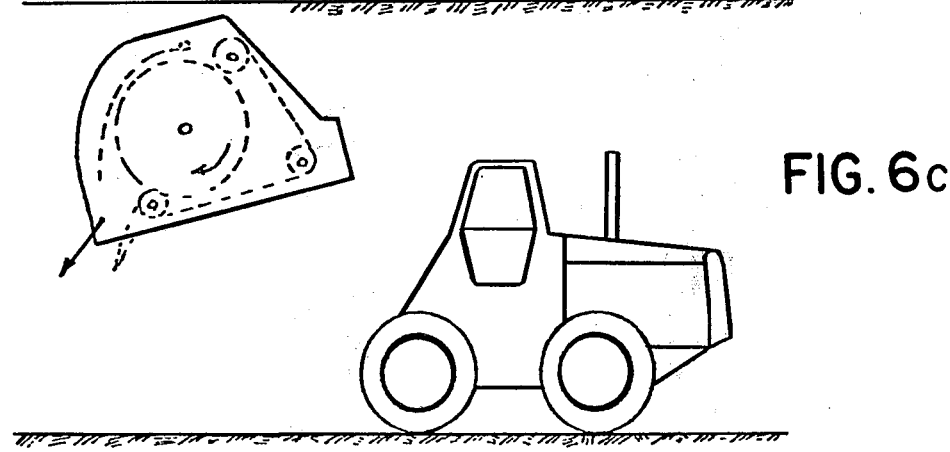

Before emptying, the machine can be put into a position indicated by FIG. 6b. While the belt is still in motion, further classification and separation will take place without any input of new material. As soon as the material consists of rocks only, the machine can be tilted as illustrated in FIG. 6c and the direction of motion of the chain belt can be reversed. The rocks can thereby quickly be emptied into a truck, or dumper, through the point of entry of the material.

The grid 11 pivots about the shaft 4 and rests by its own weight against the positioning rod 3. It might be necessary to utilize some restraining on the grid motion to minimize the loss of material through the entry area. During the material discharge phase, the grid will swing out of its normal position and let the material pass. If a larger entry opening is needed, the positioning rod 3 can be moved higher up on the sidewalls 1 and 2.

Figure 5:
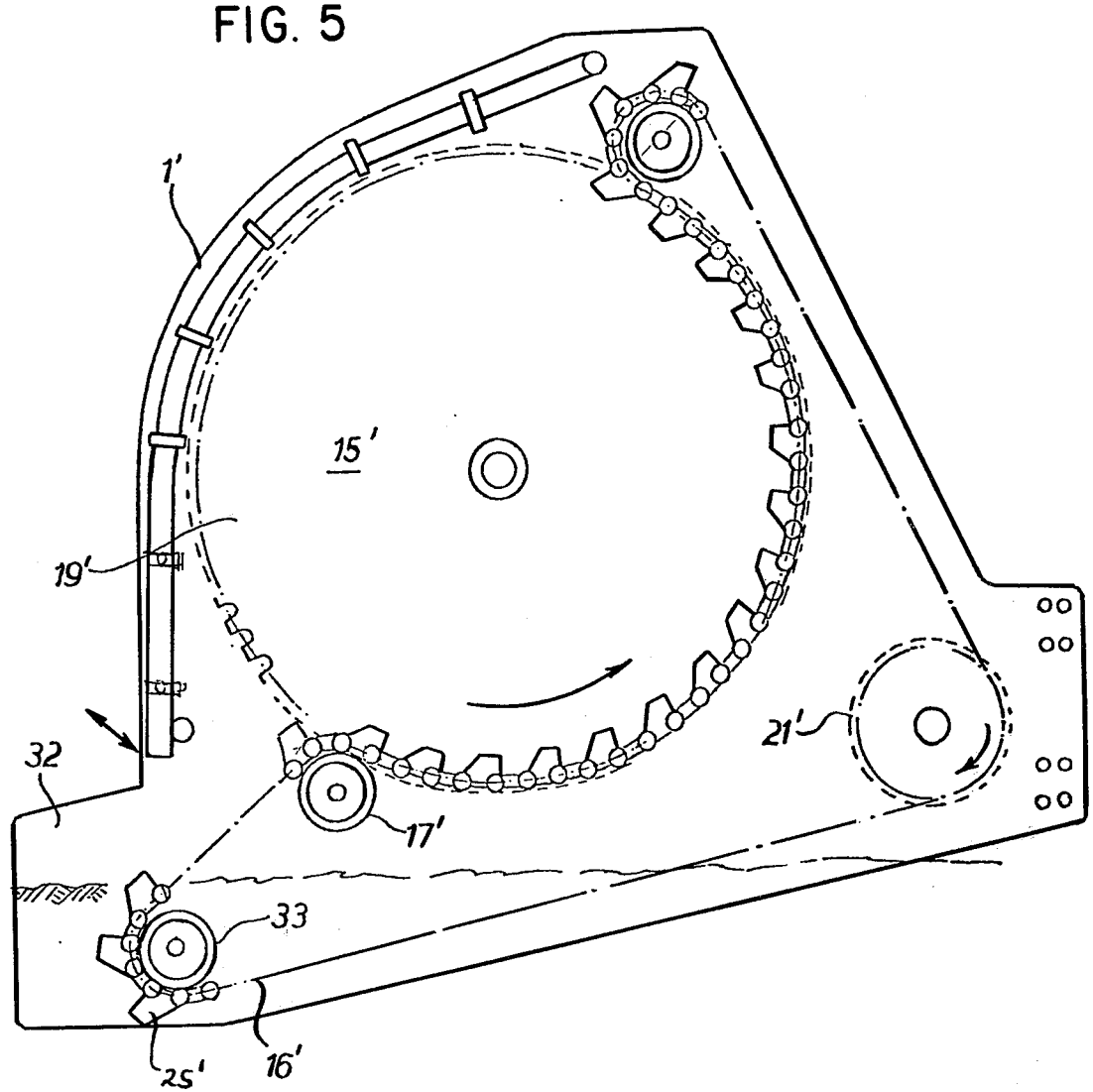
FIG. 5, shows a section view of a slightly modified version of the machine, where the cutting edge is replaced by the chain belt itself.

FIG. 5 illustrates a modified version of the cultivating machine shown in FIGS. 1 through 4. The difference being that the feeding mechanism consists of the chain belt itself. The common components between FIG. 5 and FIGS. 1 through 4 is marked with a prime in FIG. 5. The sidewall 1' is extended downwards by the extention 32 and designed as a retaining wall and guides the material picked up by the chain belt 16' into the classifying chamber 15'. The additional roller 33 is mounted by shaft and bearings to the side walls and the chain belt is pulled over this roller between the drive sprocket 21' and the other roller 17'. The cams 25' on the chain belt 16' are in this case formed as teeth which tear up the soil and the rocks and feed this material into the classifying chamber 15'.

The mode of operation of this machine is otherwise as described under the first example of design. The construction of the chain belt is principally as shown in FIG. 3. The working depth of the machine is determined by the depth of operation of the belt 16' and roller 33 and this depth can be adjusted by the lifting mechanisms of the source of power e.g. a front loader as described above. It is also possible to make the roller 33 adjustable, however, this method is well known and not shown in FIG. 5.

There are no shields shown in FIG. 5, however, the same principle of design as shown in FIG. 2 would be applied. The advantage of using the chain belt directly as a feeding mechanism over the cutting edge with teeth described above, is that while the machine is stationary with moving chain belt it will still feed material into the chamber 15' and larger objects could more easily be picked up. In addition the machine would have less of a tendency to wedge under large rocks or roots. The characteristics of the soil would determine the type of machine to be used. The device shown in FIG. 5 can be mounted on, for example, a front loader as illustrated by FIG. 6a through 6c and as discussed above.

FIG. 7 shows a schematic with the cultivating machine pulled by a tractor 34. The machine can substantially be constructed as discussed above by the two examples, however, the rear end is supported by wheels 35.

FIG. 8 shows a side view of a self-powered unit and the construction is in principle the same as described above. The unit is moving on belts 36 and the side walls are mounted in bearings 37 in the chassis (see FIG. 9). A powerful hydraulic cylinder 38 is mounted on each side of the chassis and the piston rods are connected to the side walls of the classifying chamber. The working depth of the cultivating machine can be adjusted and the chamber can be emptied by the use of the hydraulic cylinders. The discharge process is executed by the tilting of the whole assembly about the point of pivot 37 and the rocks fall as indicated by the arrow in FIG. 9. The belt is kept in motion in the normal direction and this will speed the discharging process. In this example, the grid 39 pivots about 40 at its lower end and rests by the upper end against the positioning bar 41. The machine shown in FIGS. 8 and 9 are of the type with the chain belt used as the feeding mechanism.

The chain belt has an important function as a classifying device. The size of the rocks to be discharged through the belt and returned to the ground is determined by the configuration and size of the linkage members, and will vary with the local conditions. The material in the chamber 15 that passes through the chain belt must also pass through the chain belt which is moving between sprocket 21 and the roller 17 and a preferred construction of the belt would make the passages larger in this zone than inside the chamber and thereby reduce the chances of pluggage. For this purpose the chain belt can be constructed as shown in FIGS. 10a and b.

The chain belt is in principle constructed as shown in FIG. 3, however, some of the chain linkages or cams 26 in FIG. 3 have been replaced with members 42 which freely turn on the chain shafts 23. While the belt is moving inside the chamber, the end pieces of the loose cams will point in a direction opposite to the direction of motion. It is assumed in FIG. 10 that the chain belt is moving from left to right. As soon as the belt returns to the zone between the drive sprocket 21 and the roller 17, these cams will drop down by their own weight and thereby leave the slot 43 open and make larger passages and give less resistance for the material to pass through, than in the chamber itself. This type of construction could also be provided by other means, for example each cam can be fastened to a short sleeve 44 with free moving sleeves as 24 on each side.

What we claim is:

1. A soil cultivating machine comprising,
   horizontally disposed comminuting and classifying means formed of a pair of spaced vertically disposed side wall members,
   a displaceable foraminous chain belt disposed between said side wall members adapted to move in an upwardly directed generally semicircular path and,
   an arcuately shaped foraminous grid cooperatively associated with said chain belt and side wall members to form a generally cylindrically shaped foraminous comminuting chamber,
   means positioned to be displaced through and below the surface of the soil to be cultivated for introducing soil and rocks contained therein into the lower portion of said chamber intermediate the dependent end of said grid and the dependent terminus of said semicircular path of said displaceable chain belt, and
   means for displacing said chain belt upwardly along said semicircular path to repetitively and rotatably recycle soil and rocks disposed within said chamber to progressively comminute the same.

2. A soil cultivating machine as set forth in claim 1 including a pair of sprocket wheels rotatably mounted on said side wall members and engageable by the marginal edges of said chain belt for guiding the latter in its semicircular path of displacement.

3. A soil cultivating machine as set forth in claim 1 wherein said semicircular path of displacement of said chain belt is dependently initiated slightly in front of the vertical axis thereof.

4. A soil cultivating machine as set forth in claim 1 wherein said arcuately shaped foraminous grid is pivotally mounted adjacent the upper terminus of said semicircular path of displacement of said chain belt, means for positioning the lower end thereof in displaceable spaced relation with the lower terminus of said semicircular path of displacement of said chain belt to define a soil entry aperture to said chamber.

5. A soil cultivating machine as set forth in claim 1 wherein said spaced planar side wall members cooperate with said soil introduction means to effect introduction of material to be comminuted into such chamber.

6. A soil cultivating machine as set forth in claim 1 wherein said soil introduction means includes a cutting edge incorporating protruding teeth mounted adjacent the dependent terminus of the arcuate path of displacement of said chain belt.

7. A soil cultivating machine as set forth in claim 1 including means positioning the dependent terminus of said semiconductor path of displacement of said chain belt beneath the surface of the soil to be cultivated.

8. A soil cultivating machine as set forth in claim 1 wherein said chain belt comprises,
   a plurality of elongate shaft members disposed in parallel spaced array and positioned transverse to the direction of chain belt displacement,
   a plurality of sleeve members rotatably mounted on each of said shaft members,
   means connecting each of said sleeve members to one adjacent sleeve member in a direction parallel to that of chain belt displacement,
   each alternate sleeve member on each of said shaft members being connected to the coaligned sleeve member on the immediately preceding shaft member in the direction of displacement thereof.

9. A soil cultivating machine as set forth in claim 8 wherein said means interconnecting said sleeve members comprise,
   cam members extending upwards from said sleeve surfaces and directly inwardly of said chamber.

10. A soil cultivating machine as set forth in claim 8 and including freely moving cam members sized to bridge the longitudinal distance between adjacent sleeves and pivotally displaceable by gravity out of engagement with said adjacent sleeve members when said chain is being displaced outside of the semicircular path of displacement thereof.

11. A soil cultivating machine as set forth in claim 1 including roller means engageable by said chain belt for effecting change of direction of belt displacement and defining the start and finish of said semicircular path of displacement.

12. A soil cultivating machine as set forth in claim 11 wherein the roller defining the upper terminus of said semicircular path of chain displacement is of relatively small diameter and effects an approximately 180° change in direction of belt displacement for effecting ejection of residual material engaged therewith.

* * * * *

UNITED STATES PATENT OFFICE
CERTIFICATE OF CORRECTION

Patent No. 4,005,755  Dated February 1, 1977

Inventor(s) Even A. Bakke et al.

It is certified that error appears in the above-identified patent and that said Letters Patent are hereby corrected as shown below:

Column 3, line 57, "of" should read -- or --.

Column 6, line 43, after "described" should read -- above --.

Column 8, line 33, "semiconductor" should read -- semi-circular --.

Signed and Sealed this second Day of August 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 4,005,755      Dated February 1, 1977

Inventor(s) Even A. Bakke et al.

It is certified that error appears in the above-identified patent and that said Letters Patent are hereby corrected as shown below:

Column 3, line 57, "of" should read -- or --.

Column 6, line 43, after "described" should read -- above --.

Column 8, line 33, "semiconductor" should read -- semicircular --.

Column 4, line 22, "29" should read -- 19 --.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*